(12) United States Patent
Fujioka

(10) Patent No.: US 12,270,376 B2
(45) Date of Patent: Apr. 8, 2025

(54) WIND TURBINE MONITORING DEVICE, WIND TURBINE SYSTEM, AND WIND TURBINE MONITORING METHOD

(71) Applicant: VESTAS WIND SYSTEMS A/S, Aarhus (DK)

(72) Inventor: Hideyasu Fujioka, Tokyo (JP)

(73) Assignee: VESTAS WIND SYSTEMS A/S, Aarhus (DK)

( * ) Notice: Subject to any disclaimer, the term of this patent is extended or adjusted under 35 U.S.C. 154(b) by 29 days.

(21) Appl. No.: 18/246,328

(22) PCT Filed: Sep. 16, 2021

(86) PCT No.: PCT/DK2021/050283
§ 371 (c)(1),
(2) Date: Mar. 22, 2023

(87) PCT Pub. No.: WO2022/063370
PCT Pub. Date: Mar. 31, 2022

(65) Prior Publication Data
US 2023/0366383 A1     Nov. 16, 2023

(30) Foreign Application Priority Data

Sep. 23, 2020 (EP) .................................... 20197737

(51) Int. Cl.
F03D 17/00         (2016.01)
F03D 80/30         (2016.01)

(52) U.S. Cl.
CPC ......... F03D 17/013 (2023.08); F03D 17/021 (2023.08); F03D 17/028 (2023.08);
(Continued)

(58) Field of Classification Search
CPC ......... Y02E 10/72; F03D 17/00; F03D 80/30; F03D 80/50; F03D 7/046; F03D 7/048;
(Continued)

(56) References Cited

U.S. PATENT DOCUMENTS 8,258,773 B2 *   9/2012   Brnada .................. G01R 15/18
                                                  324/72
9,835,141 B2 *   12/2017  Erichsen ................. F03D 80/30
(Continued)

FOREIGN PATENT DOCUMENTS

CN      109209783 A      1/2019
CN      110778467 A      2/2020
(Continued)

OTHER PUBLICATIONS

EPO, Extended European Search Report for Application 201977378.-1007 dated Feb. 25, 2021.
(Continued)

*Primary Examiner* — Eric J Zamora Alvarez
(74) *Attorney, Agent, or Firm* — Patterson + Sheridan, LLP

(57) ABSTRACT

A wind turbine monitoring device for monitoring a wind turbine including a lightning sensor for detecting a lightning strike on a wind turbine blade includes a lightning parameter acquisition part configured to acquire at least one lightning parameter based on an output of the lightning sensor, a lightning level determination part configured to determine a level of the lightning strike based on the at least one lightning parameter acquired by the lightning parameter acquisition part; and an inspection control part configured to judge whether it is necessary to automatically inspect the wind turbine blade by at least one inspection unit for
(Continued)

inspecting the wind turbine blade, according the level of the lightning strike determined by the lightning level determination part.

20 Claims, 10 Drawing Sheets

(52) U.S. Cl.
CPC .......... *F03D 80/30* (2016.05); *F05B 2260/80* (2013.01); *F05B 2270/1077* (2020.08)

(58) Field of Classification Search
CPC .... F03D 17/013; F03D 17/021; F03D 17/028; F05B 2260/80; F05B 2240/96; F05B 2260/84; F05B 2270/333; F05B 2270/1077; F05B 2270/324; F05B 2270/803; B64D 2045/0085; B64D 45/02; G01R 19/165; G05B 2219/2619

See application file for complete search history.

(56) References Cited

U.S. PATENT DOCUMENTS

| | | | |
|---|---|---|---|
| 10,371,123 B2 * | 8/2019 | Kammer | F03D 17/00 |
| 2012/0133146 A1 * | 5/2012 | Naka | H02G 13/00 |
| | | | 73/170.24 |
| 2012/0136630 A1 * | 5/2012 | Murphy | F03D 17/00 |
| | | | 702/188 |
| 2012/0300059 A1 * | 11/2012 | Stege | F03D 17/00 |
| | | | 348/114 |
| 2014/0093373 A1 | 4/2014 | Schmidt et al. | |
| 2018/0003161 A1 * | 1/2018 | Michini | F03D 17/00 |
| 2020/0173423 A1 * | 6/2020 | Kirkegaard | G08C 17/00 |
| 2020/0400127 A1 * | 12/2020 | Lowenhar | G01N 29/14 |
| 2021/0079890 A1 * | 3/2021 | Zhang | F03D 7/046 |
| 2022/0099067 A1 * | 3/2022 | Packer | F03D 17/00 |
| 2022/0195994 A1 * | 6/2022 | Elberling | G06T 7/001 |
| 2022/0282709 A1 * | 9/2022 | Lübker | F03D 17/00 |

FOREIGN PATENT DOCUMENTS

| | | |
|---|---|---|
| EP | 2884099 A1 | 6/2015 |
| WO | 2022063370 A1 | 3/2022 |

OTHER PUBLICATIONS

PCT, Notification of Transmittal of The International Search Report and The Written Opinion of The International Searching Authority, or The Declaration for Application PCT/DK2021/050283 dated Dec. 2, 2021.

* cited by examiner

WIND TURBINE MONITORING DEVICE, WIND TURBINE SYSTEM, AND WIND TURBINE MONITORING METHOD

TECHNICAL FIELD

This disclosure relates to a wind turbine monitoring device, a wind turbine system, and a wind turbine monitoring method.

BACKGROUND

Patent Document 1 discloses a state monitoring system for a wind turbine power generating apparatus for accurately estimating the damage state of wind turbine blades due to a lightning strike. In this state monitoring system, the damage state of wind turbine blades is estimated based on a lightning parameter indicating the severity of the lightning strike.

CITATION LIST

Patent Literature

Patent Document 1: JP5614765B

SUMMARY

When lightning strikes a wind turbine blade on a wind turbine generator, the damage state of the wind turbine blade can be checked by inspecting the wind turbine blade. However, it is undesirable in terms of labor and cost to dispatch a person for inspection regardless of the magnitude of the damage risk of the lightning strike. It is desirable to perform automatic inspection of the wind turbine blade according to the magnitude of the damage risk of the lightning strike. In this regard, Patent Document 1 does not disclose a configuration for judging the necessity of automatic inspection of the wind turbine blade according to the magnitude of the damage risk of the wind turbine blade.

In view of the above, an object of the present disclosure is to provide a wind turbine monitoring device, a wind turbine system, and a wind turbine monitoring method whereby it is possible to judge whether it is necessary to automatically inspect the wind turbine blade according to the magnitude of the damage risk of the wind turbine blade.

To accomplish the above object, a wind turbine monitoring device according to the present disclosure, for monitoring a wind turbine including a lightning sensor for detecting a lightning strike on a wind turbine blade, comprises: a lightning parameter acquisition part configured to acquire at least one lightning parameter based on an output of the lightning sensor; a lightning level determination part configured to determine a level of the lightning strike based on the at least one lightning parameter acquired by the lightning parameter acquisition part; and an inspection control part configured to judge whether it is necessary to automatically inspect the wind turbine blade by at least one inspection unit for inspecting the wind turbine blade, according the level of the lightning strike determined by the lightning level determination part.

Further, to accomplish the above object, a wind turbine monitoring method according to the present disclosure, for monitoring a wind turbine including a lightning sensor for detecting a lightning strike on a wind turbine blade, comprises: acquiring at least one lightning parameter based on an output of the lightning sensor; determining a level of the lightning strike based on the at least one lightning parameter; and judging whether it is necessary to automatically inspect the wind turbine blade by at least one inspection unit for inspecting the wind turbine blade, according the level of the lightning strike.

According to the present disclosure, there is provided a wind turbine monitoring device, a wind turbine system, and a wind turbine monitoring method whereby it is possible to judge whether it is necessary to automatically inspect the wind turbine blade according to the magnitude of the damage risk of the wind turbine blade.

DETAILED DESCRIPTION

Embodiments of the present disclosure will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
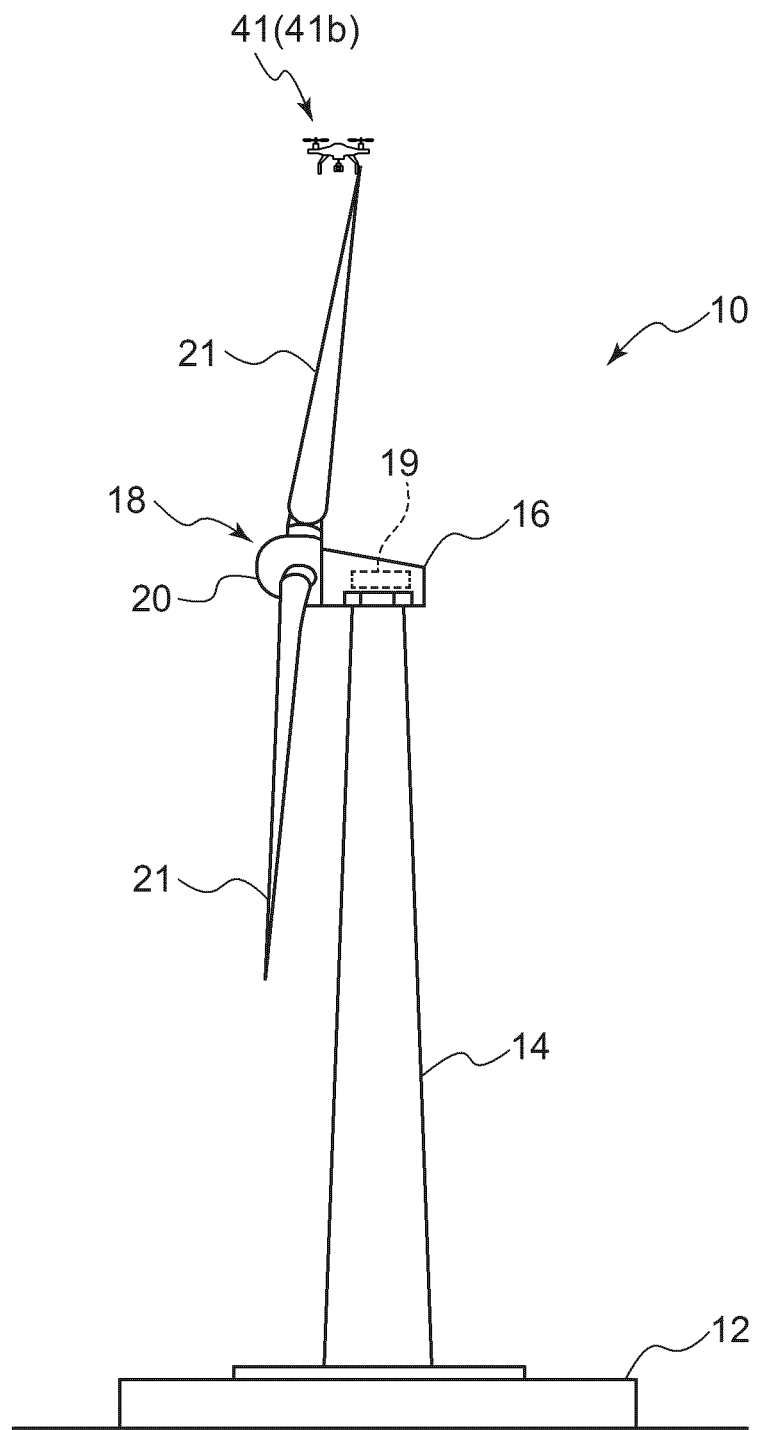
FIG. 1 is a schematic side view of a wind turbine 10 to be monitored by a wind turbine monitoring device according to an embodiment.

FIG. 1 is a schematic side view of a wind turbine 10 to be monitored by a wind turbine monitoring device according to an embodiment.

The wind turbine 10 includes a tower 14 installed on a foundation 12, a nacelle 16 disposed on the upper end of the tower 14, a rotor 18, and a generator 19 driven by the rotor 18. The rotor 18 includes a rotor head (hub) 20 rotatably attached to the nacelle 16, and at least one wind turbine blade (blade) 21 attached to the rotor head 20. In an embodiment, the wind turbine 10 has three wind turbine blades 21.

When the rotor 18 is rotated by wind power, the generator 19 generates electric power, and the electric power is supplied to a power grid connected to the generator 19. The wind turbine 10 can be installed both onshore and offshore.

Figure 2:
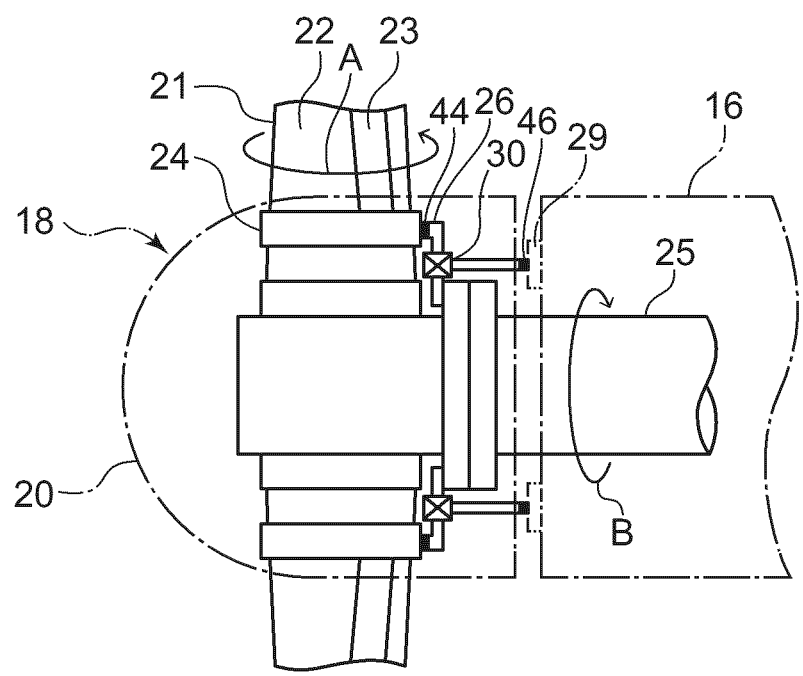
FIG. 2 is a diagram schematically showing a surrounding structure of a rotor 18.

FIG. 2 is a diagram schematically showing a surrounding structure of the rotor 18.

In some embodiments, each wind turbine blade 21 of the wind turbine 10 includes a hollow blade body 22 composed of, for example, a glass fiber reinforced plastic (GFRP) or carbon fiber reinforced plastic (CFRP) and a coil or (mesh) metal layer 23 formed on the surface of the blade body 22. In other cases, the wind turbine blade 21 includes the hollow blade body 22 and a conductor inside the blade body 22. This figure shows the former. The metal layer 23 extends from the blade tip to the blade root of each wind turbine blade 21, and is electrically connected to a conductive electric discharge member 24 fitted at the blade root.

The electric discharge member 24 is electrically connected to a power receiving part 29 disposed on the nacelle 16 via a spoke-like conductive material 26 extending radially from the nacelle 16, and is electrically connected to the nacelle 16. The conductive portion of the nacelle 16 is electrically connected to the conductive portion of the tower 14. One end of the conductive material 26 forms a contact point 44 which is slidable on the outer peripheral surface of the electric discharge member 24 when the wind turbine blade 21 changes the pitch angle in the direction A. The other end of the conductive material 26 forms a contact point 46 which is slidable on the power receiving part 29 when the rotor 18 rotates in the direction B. Thus, the metal layer 23, the electric discharge member 24, the nacelle 16, and the tower 14 constitute a current path (grounding line) 28 (see FIG. 4) extending from the tip of the wind turbine blade 21 to the lower end of the tower 14, and the metal layer 23 functions as a down-conductor. Each wind turbine blade 21 may have a conductive wire extending inside the wind turbine blade 21 as a down-conductor. The current path 28 constitutes a lightning protection system (LPS) of the wind turbine blade 21.

Figure 3:
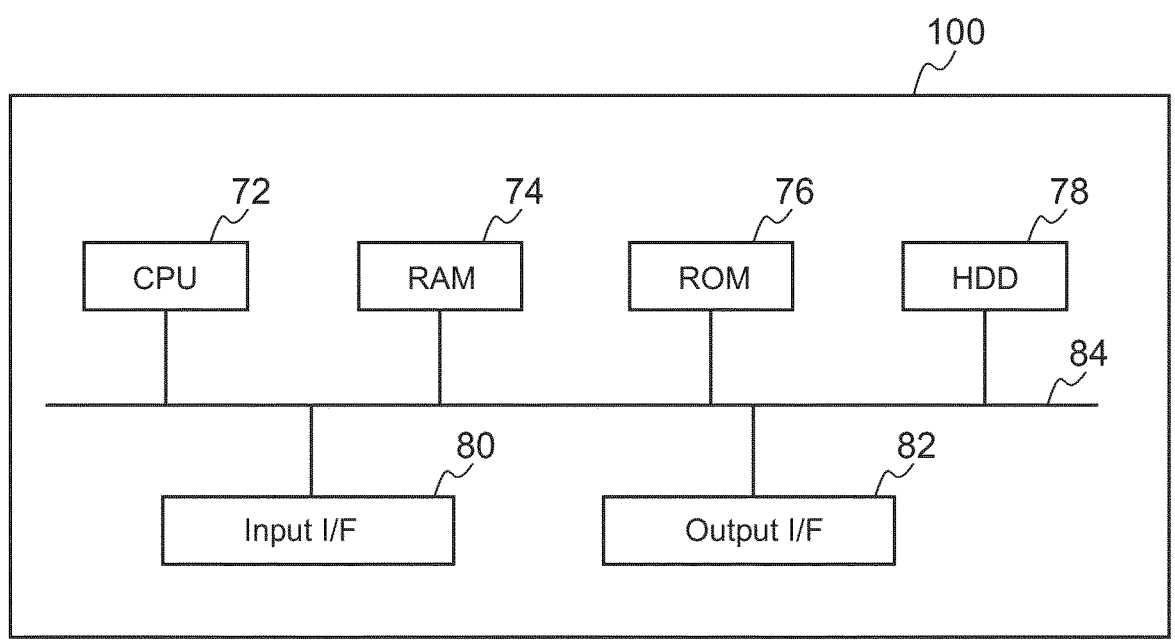
FIG. 3 is a diagram showing a hardware configuration of a wind turbine monitoring device 100 for monitoring the wind turbine 10.

FIG. 3 is a diagram showing a hardware configuration of a wind turbine monitoring device 100 for monitoring the wind turbine 10.

The wind turbine monitoring device 100 is provided by a computer including a central processing unit (CPU) 72, a random access memory (RAM) 74, a read only memory (ROM) 76, a hard disk drive (HDD) 78, an input I/F 80, and an output I/F 82, which are connected via a bus 84. The hardware configuration of the wind turbine monitoring device 100 is limited thereto, and may be configured by a combination of a control circuit and a storage device. The wind turbine monitoring device 100 is provided by executing a program that realizes each function of the wind turbine monitoring device 100 by the computer. The function of each part of the wind turbine monitoring device 100 described below is realized by, for instance, loading a program stored in the ROM 76 into the RAM 74 and executing the program by the CPU 72, and reading and writing data in the RAM 74 or the ROM 76. Further, with an arithmetic device specialized for image processing such as graphics processing unit (GPU), image data can be more efficiently processed.

Figure 4:
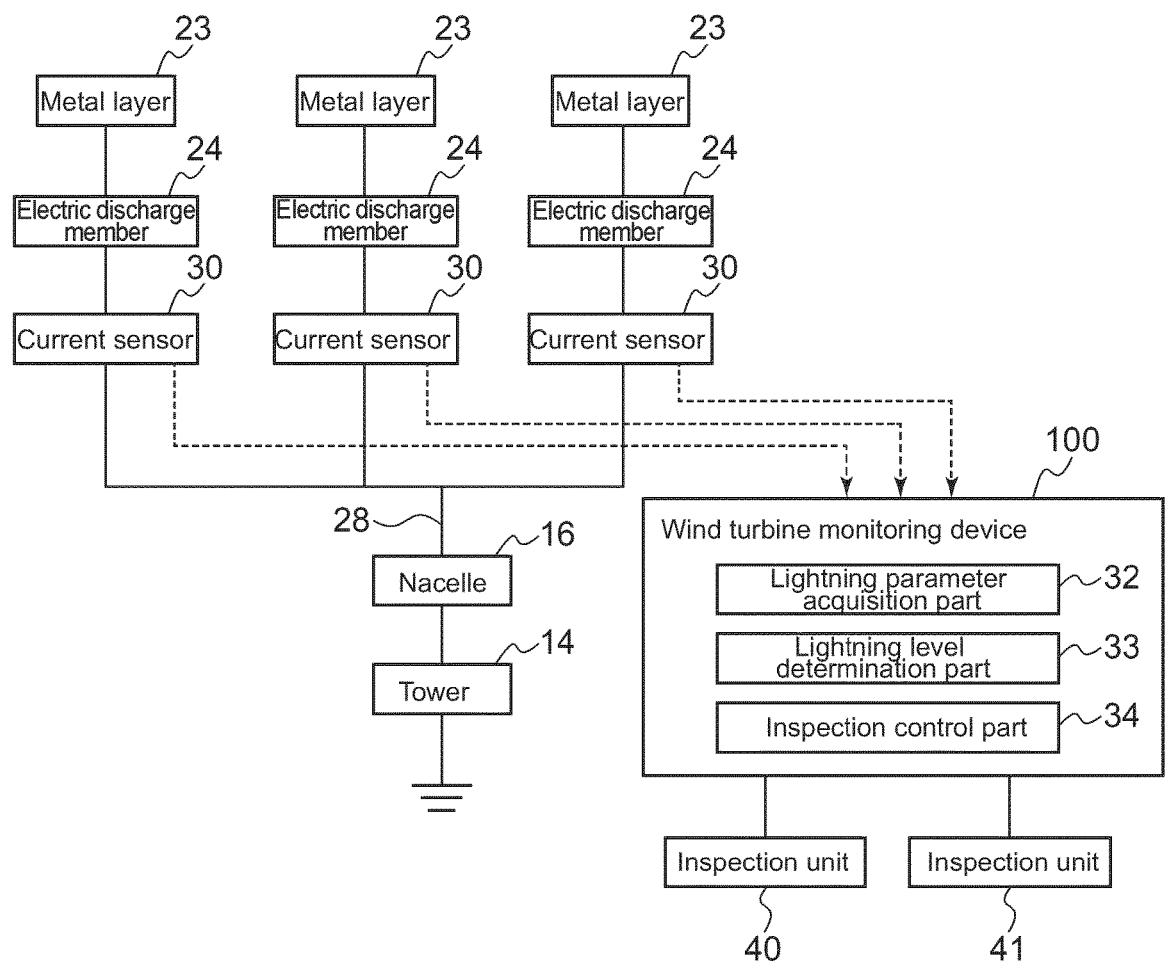
FIG. 4 is a block diagram for describing a functional configuration of the wind turbine monitoring device 100.

FIG. 4 is a block diagram for describing a functional configuration of the wind turbine monitoring device 100. The wind turbine monitoring device 100 is arranged, for instance, inside the nacelle 16, and the wind turbine 10 and the wind turbine monitoring device 100 constitutes a wind turbine system.

As shown in FIG. 4, a current sensor 30 is attached to a portion of the current path 28 for example between the electric discharge member 24 and the nacelle 16 as a lightning sensor for detecting a lightning strike on the wind turbine blade 21. In an embodiment, three current sensors 30 are attached to three parallel portions of respective current paths 28 of three wind turbine blades 21. More specifically, one current sensor 30 is attached to each of the three conductive materials 26. That is, the current sensor 30 is disposed on each wind turbine blade 21 to detect a lightning current flowing through the wind turbine blade 21. The current sensor 30 is, for example, a Rogowski coil or a current transducer.

The wind turbine monitoring device 100 includes a lightning parameter acquisition part 32, a lightning level determination part 33, and an inspection control part 34.

The lightning parameter acquisition part 32 is configured to acquire a plurality of lightning parameters based on the output of the current sensor 30. In the present embodiment, the lightning parameter acquisition part 32 acquires a plurality of lightning parameters for example including a peak value of lightning current flowing through the wind turbine blade 21 due to the lightning strike, a specific energy of the lightning strike obtained by integrating the square of the lightning current over the duration of the lightning strike, and/or an electric charge of the lightning strike obtained by integrating the lightning current over the duration of the lightning strike, based on the output of the current sensor 30. Hereinafter, the term "peak value of current" means the peak value of the lightning current (maximum value of lightning current) acquired by the lightning parameter acquisition part 32, the term "specific energy" means the specific energy of the lightning strike acquired by the lightning parameter acquisition part 32, and the term "electric charge" means the electric charge of the lightning strike acquired by the lightning parameter acquisition part 32.

The lightning level determination part 33 determines a level of the lightning strike detected by the current sensor 30 from a plurality of lightning levels Q1 to Q4, based on the plurality of lightning parameters (peak value of lightning current, specific energy, and electric charge) acquired by the lightning parameter acquisition part 32.

In the present embodiment, the plurality of lightning levels includes four levels: Q1 (first level), Q2 (second level), Q3 (third level) and Q4 (fourth level) in order of severity. Specifically, among the four lightning levels Q1 to Q4, Q1 is the least severe, Q2 is more severe than Q1, Q3 is more severe than Q2, and Q4 is more severe than Q3 and the most severe. Other embodiments of the invention may have fewer or more levels.

An example of a method for determining the level of the lightning strike by the lightning level determination part 33 will now be described.

First, the lightning level determination part 33 determines whether the level of the lightning strike detected by the current sensor 30 is Q1. Specifically, if all of the following conditions 1, 2, and 3 are satisfied, it is determined that the level of the lightning strike is Q1.

Condition 1: peak value of lightning current is greater than 0 and equal to or less than threshold I1.

Condition 2: specific energy is greater than 0 and equal to or less than threshold E1.

Condition 3: electric charge is greater than 0 and equal to or less than threshold C1.

The thresholds I1, E1, and C1 may be for example, but is not limited to, 100 (kA), 2.5 (MJ/ohm), and 150 (C), respectively.

If the level of the lightning strike is not Q1, the lightning level determination part 33 determines whether the level of the lightning strike is Q4. Specifically, if at least one of the following conditions 4, 5, and 6 is satisfied, it is determined that the level of the lightning strike is Q4.

Condition 4: peak value of lightning current is greater than threshold I3.

Condition 5: specific energy is greater than threshold E3.

Condition 6: electric charge is greater than threshold C3.

The thresholds I3, E3, and C3 are greater than the thresholds I1, E1, and C1, respectively. The thresholds I3, E3, and C3 may be for example, but is not limited to, 200 (kA), 10 (MJ/ohm), and 300 (C), respectively.

If the level of the lightning strike is neither Q1 nor Q4, and if at least one of the following conditions 7, 8, and 9 is satisfied, the lightning level determination part 33 determines that the level of the lightning strike is Q3.

Condition 7: peak value of lightning current is greater than threshold I2.

Condition 8: specific energy is greater than threshold E2.

Condition 9: electric charge is greater than threshold C2.

The thresholds I2, E2, and C2 are greater than the thresholds I1, E1, and C1, respectively. Further, the thresholds I2, E2, and C2 are less than the thresholds I3, E3, and C3, respectively. The thresholds I2, E2, and C2 may be for example, but is not limited to, 150 (kA), 5.6 (MJ/ohm), and 225 (C), respectively.

If the level of the lightning strike is neither Q1, Q3 nor Q4, since at least one of the following conditions 10, 11, and 12 is satisfied, it is determined that the level of the lightning strike is Q2.

Condition 10: peak value of lightning current is greater than threshold I1.

Condition 11: specific energy is greater than threshold E1.

Condition 12: electric charge is greater than threshold C1.

The inspection control part 34 is configured to judge whether it is necessary to automatically inspect the wind turbine blade 21 by at least one inspection unit 40 for automatically inspecting the damage state of the wind turbine blade 21, according the level Q1 to Q4 of the lightning strike determined by the lightning level determination part 33. Further, the inspection control part 34 is configured to judge whether it is necessary to inspect the wind turbine blade 21 by at least one inspection unit 41 for inspecting the damage state of the wind turbine blade 21, according the level Q1 to Q4 of the lightning strike determined by the lightning level determination part 33. The inspection unit 40 and the inspection unit 41 differ in the manner of inspecting the wind turbine blade 21. Herein, the "automatic inspection" means that the inspection unit 40 automatically inspects the wind turbine blade 21 without any manual operation.

Figure 5:
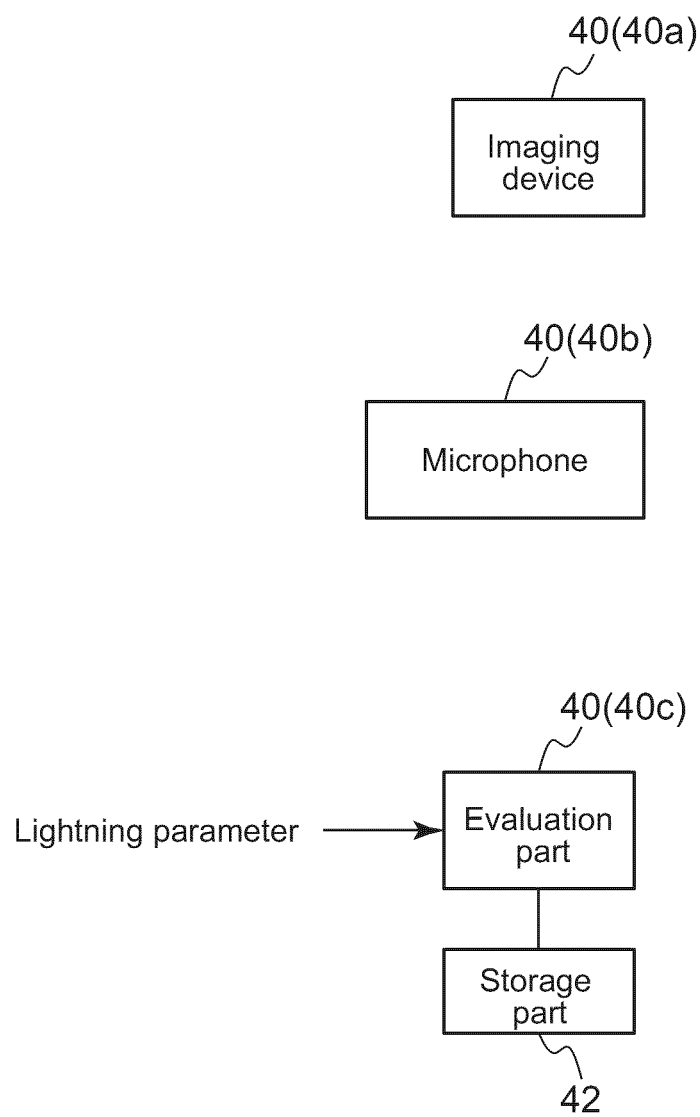
FIG. 5 is a diagram showing configuration examples of an inspection unit 40.
Figure 6:
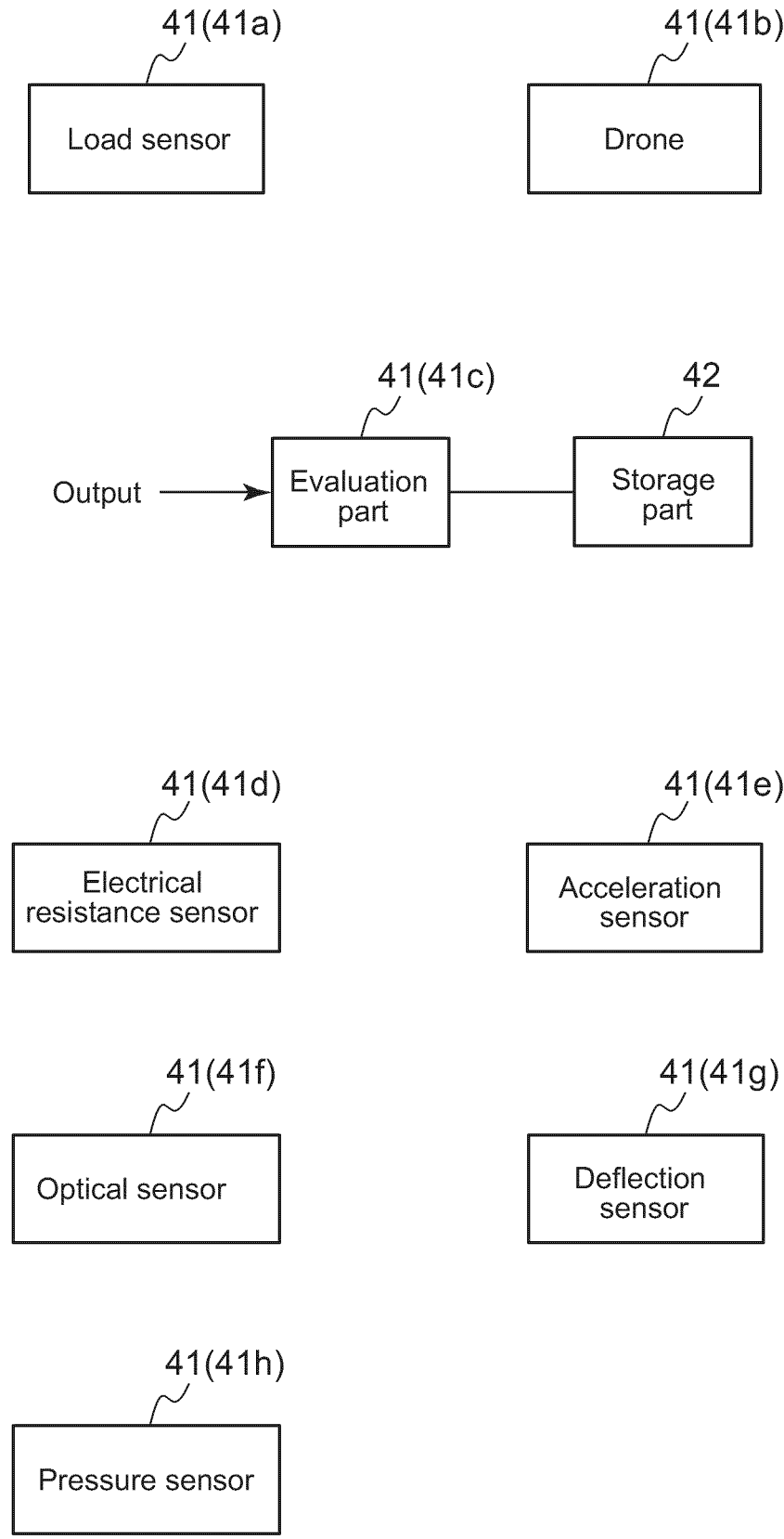
FIG. 6 is a diagram showing configuration examples of an inspection unit 41.

The at least one inspection unit 40 is an inspection unit which enables simple automatic inspection of the wind turbine blade 21, and includes at least one of an imaging device 40a, a microphone 40b, or an evaluation part 40c, as shown in FIG. 5. The at least one inspection unit 41 is an inspection unit which enables remote inspection of the wind turbine blade 21 without sending a person to the wind turbine 10, and includes at least one of a load sensor 41a, a drone 41b, an evaluation part 41c, an electrical resistance sensor 41d, an acceleration sensor 41e, an optical sensor 41f, a deflection sensor 41g, or a pressure sensor 41h.

Figure 7:
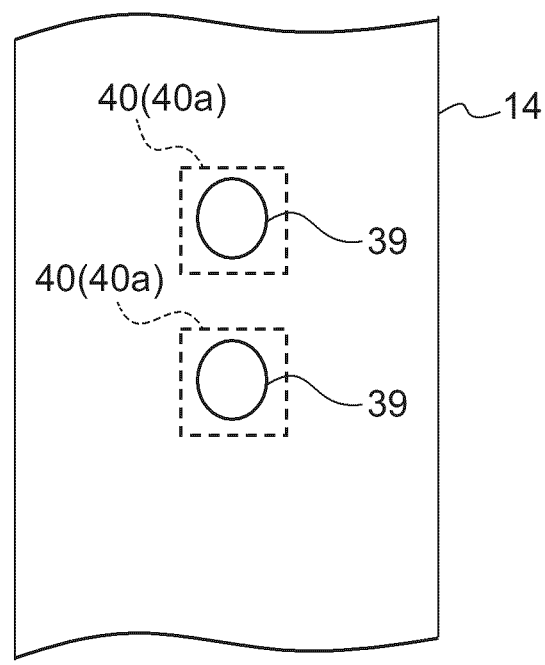
FIG. 7 is a schematic diagram for describing an imaging device 40a fixed to a tower 14.

The imaging device 40a shown in FIG. 5 may be a camera fixed to a hole 39 provided in an outer wall of the tower 14, for example as shown in FIG. 7, and configured to capture an image of the wind turbine blade 21. In the example shown in FIG. 7, the at least one inspection unit 40 includes a plurality of imaging devices 40a. The imaging devices 40a are cameras fixed to respective holes 39 arranged along the height direction of the tower on the outer wall of the tower 14. Imaging devices 40a may alternatively be moveable for example on a rail along the tower or around the tower. One or more illumination devices, such as lamps, may also be provided to allow for improved imaging.

Figure 8:
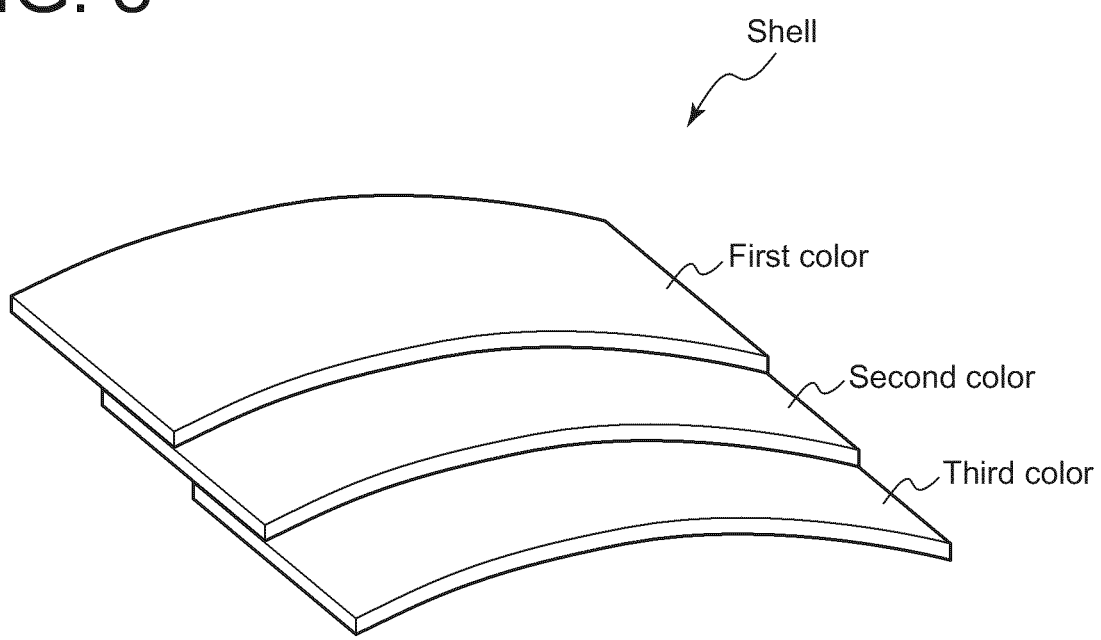
FIG. 8 is a schematic diagram for describing a shell composed of a plurality of layers of different colors.

Further, when the shell of the wind turbine blade 21 includes a plurality of layers having different colors as shown in FIG. 8, the damage state of the wind turbine blade 21 may be inspected based on the color of the shells of the wind turbine blade 21 captured by the imaging device 40a.

The microphone 40b shown in FIG. 5 may be fixed inside the wind turbine blade 21, for example. Since the wind turbine blade 21 is formed by joining a plurality of structural parts, when the joint condition of the structural parts deteriorates due to a lightning strike, sound is generated at the joint. Thus, by detecting the sound with the microphone 40b fixed inside the wind turbine blade 21, the damage state of the wind turbine blade 21 can be inspected.

The evaluation part 40c inspects the wind turbine blade 21 by reading correlation information indicating a relationship between the plurality of lightning parameters (peak value of lightning current, specific energy, and electric charge) and the damage amount of the wind turbine blade 21, and evaluating the damage amount of the wind turbine blade 21 based on the correlation information and the plurality of lightning parameters. The correlation information may be generated based on a test result of a lightning protection system, which has been previously performed, and stored in a storage part 42, or may be generated from data of lightning strikes acquired by the actual wind turbine 10 and stored in the storage part 42.

The load sensor 41a is fixed to the wind turbine blade 21. When the wind turbine blade 21 is damaged, such as cracked or chipped, the load is increased as compared with the normal state of the wind turbine blade. Thus, by detecting the load on the wind turbine blade 21 with the load sensor 41a, the damage state of the wind turbine blade 21 can be inspected. The load sensor may be, for example, an optical fiber sensor or a strain gauge.

When the drone 41b is used, the wind turbine blade 21 can be inspected with a desired inspection method by bringing the drone 41b close to any portion of the wind turbine blade 21.

The evaluation part 41c inspects the wind turbine blade 21 by reading a power curve indicating a relationship between the wind speed and the output of the wind turbine 10 (amount of power generated by generator 19) from the storage part 42, and comparing the output of the wind turbine 10 after the wind turbine blade 21 is struck by lightning with the power curve to evaluate the damage state of the wind turbine blade 21. For instance, when the output of the wind turbine 10 struck by lightning is lower than the output indicated by the power curve, it may be determined that the wind turbine blade 21 is damaged.

The electrical resistance sensor 41d inspects the damage state of the wind turbine blade 21 by detecting the electrical resistance of a conductor portion (in the example shown in FIG. 2, a portion composed of the metal layer 23 and the conductive material 23) of the wind turbine blade 21. The electrical resistance sensor 41d may apply a current between the blade tip and the blade root of the wind turbine blade 21, for example, using the drone 41b (see FIG. 1) to detect the electrical resistance.

The acceleration sensor 41e is fixed to the wind turbine blade 21. The acceleration sensor 41e measures vibration of the blade of the wind turbine, converts the vibration into a spectrum by fast Fourier transform (FFT), and inspects the damage state of the blade by pattern recognition based on the peak deviation and the amplitude deviation, comparison of three wind turbine blades 21, and signal strength, and/or a comparison of the pattern of the blade with a historical pattern for the same blade.

The optical sensor 41f inspects the damage state of the wind turbine blade 21 by detecting the load applied to the wind turbine blade 21 and the deflection of the wind turbine blade 21 by a laser and a reflector disposed inside the wind turbine blade 21 or the tower 14.

The deflection sensor 41g inspects the damage state of the wind turbine blade 21 by detecting the load applied to the wind turbine blade 21 and the deflection of the wind turbine blade 21 by a camera and a reflector disposed inside the wind turbine blade 21 for pitch control.

The pressure sensor 41h inspects the damage state of the wind turbine blade 21 by detecting the internal pressure of the wind turbine blade 21. When lightning strikes the wind turbine blade 21, the internal pressure of the wind turbine blade 21 increases, and the joint condition of structural parts constituting the wind turbine blade 21 deteriorates. As a result, the holding force of a receptor (not shown) provided at the tip of the wind turbine blade 21 is reduced, so that the receptor may be detached. Therefore, the internal pressure of the wind turbine blade 21 and/or development of the pressure over time can be used as an indicator of the damage state of the wind turbine blade 21.

Figure 9:
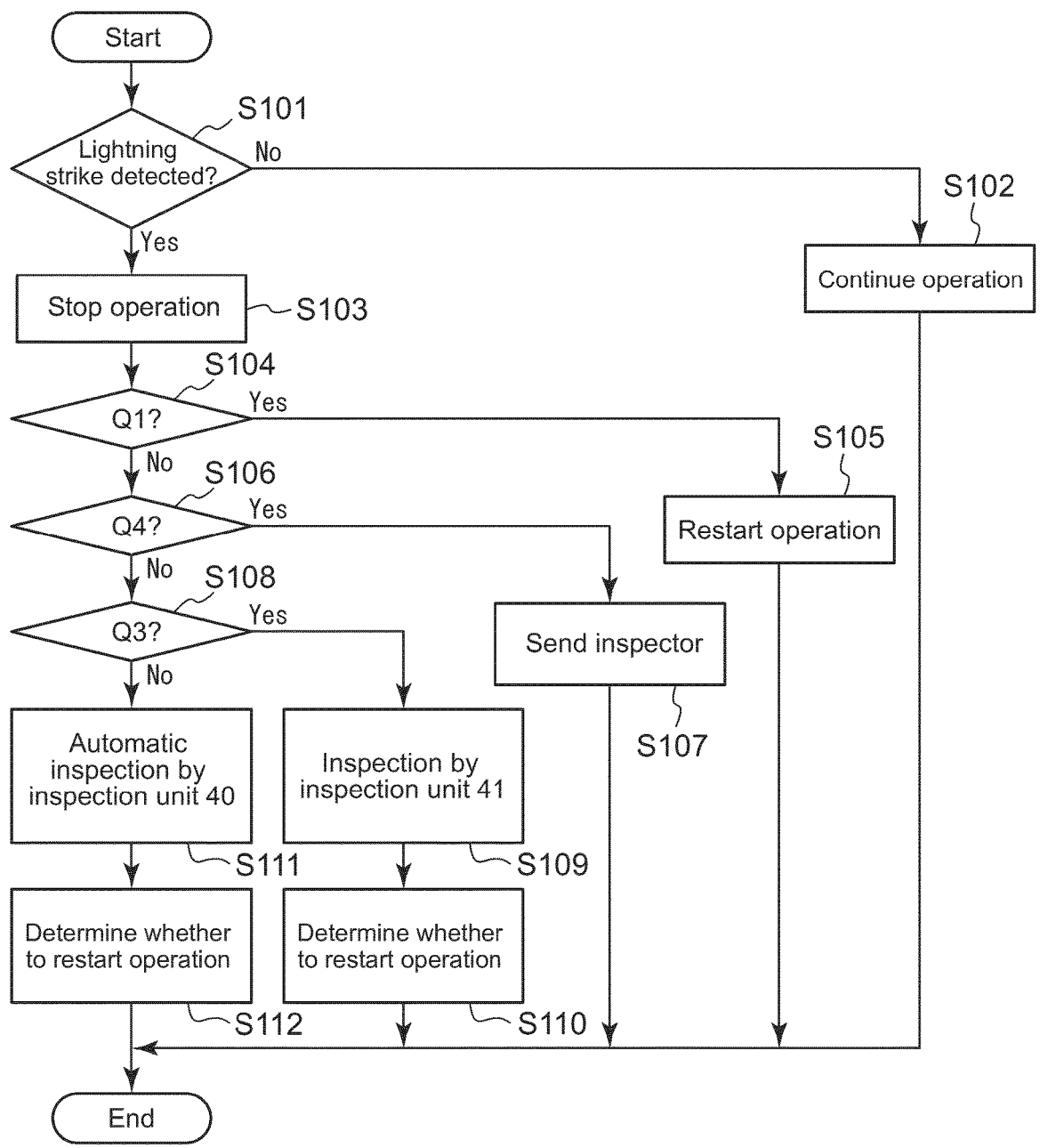
FIG. 9 is a flowchart showing an example of a method for monitoring the wind turbine by the wind turbine monitoring device 100.

Hereinafter, an example of a method for monitoring the wind turbine 10 by the wind turbine monitoring device 100 will be described. FIG. 9 is a flowchart showing an example of a method for monitoring the wind turbine 10 by the wind turbine monitoring device 100.

First, in S101, the lightning level determination part 33 judges whether the current sensor 30 detects a lightning strike on the wind turbine blade 21, based on the output of the current sensor 30.

In S101, if the current sensor 30 does not detect a lightning strike, i.e., if the current sensor 30 does not detect a current (in the case where the current sensor 30 is disposed for each wind turbine blade 21 as described above, if none of the current sensors 30 detects a current), in S102, the operation of the wind turbine 10 is continued. The expression "continuing operation of wind turbine 10" means that the rotor 18 is rotating and the power generation by the generator 19 continues.

In S101, if the current sensor 30 detects a lightning strike, i.e., if the current sensor detects a current (in the case where the current sensor 30 is disposed for each wind turbine blade 21 as described above, if any of the current sensors 30 detects a current), in S103, the inspection control part 34 stops the operation of the wind turbine 10 regardless of the level of the lightning strike. The expression "stopping operation of wind turbine 10" means that the rotor 18 is stopped and the power generation by the generator 19 is stopped.

In S104, the lightning parameter acquisition part 32 acquires a peak value of lightning current flowing through the wind turbine blade 21 due to the lightning strike, a specific energy of the lightning strike obtained by integrating the square of the lightning current over the duration of the lightning strike, and an electric charge of the lightning strike obtained by integrating the lightning current over the duration of the lightning strike as lightning parameters, based on the output of the current sensor 30. Then, the lightning level determination part 33 determines whether the level of the lightning strike detected by the current sensor 30 is Q1, based on the three lightning parameters acquired by the lightning parameter acquisition part 32. The lightning level determination part 33 determines that, if all of the above-described conditions 1, 2, and 3 are satisfied, the level of the lightning strike is Q1.

In S104, if it is determined that the level of the lightning strike is Q1, in S105, the inspection control part 34 judges that inspection of the wind turbine blade 21 by the inspection unit 40 and inspection of the wind turbine blade 21 by the inspection unit 41 are both unnecessary, and restarts the operation of the wind turbine 10 without inspecting the wind turbine blade 21.

In S104, if it is determined that the level of the lightning strike is not Q1, in S106, the lightning level determination part 33 determines whether the level of the lightning strike is Q4. The lightning level determination part 33 determines that, if at least one of the above-described conditions 4, 5, and 6 is satisfied, the level of the lightning strike is Q4.

In S106, if it is determined that the level of the lightning strike is Q4, in S107, the inspection control part 34 transmits information indicating that it is necessary to perform inspection (detailed inspection such as visual inspection) of the wind turbine blade 21 by a person and rapidly repair the wind turbine blade 21 without restarting the operation of the wind turbine 10 to a maintenance company of the wind turbine 10 or the like.

In S106, if it is determined that the level of the lightning strike is not Q4, in S108, the it is determined whether the level of the lightning strike is Q3. If the level of the lightning strike is neither Q1 nor Q4, and if at least one of the above-described conditions 7, 8, and 9 is satisfied, the lightning level determination part 33 determines that the level of the lightning strike is Q3.

In S108, if it is determined that the level of the lightning strike is Q3, in S109, remote inspection of the wind turbine blade 21 by the at least one inspection unit 41 is instructed. For instance, information indicating that it is necessary to perform remote inspection of the wind turbine blade 21 by the at least one inspection unit 41 is transmitted to a maintenance company of the wind turbine 10. Further, in S110, it is judged whether to restart the operation of the wind turbine 10, based on a result of the remote inspection of the wind turbine blade 21 by the at least one inspection unit 41. Additionally, in S108, if it is determined that the level of the lightning strike is Q3, a person may be sent within a predetermined period (for example, within 3 months) to perform detailed inspection or repair of the wind turbine blade 21.

In S108, if it is determined that the level of the lightning strike is not Q3, since at least one of the above-described conditions 10, 11, and 12 is satisfied, it is determined that the level of the lightning strike is Q2. In this case, in S111, the inspection control part 34 performs automatic inspection of the wind turbine blade 21 by the at least one inspection unit 40. In S112, the inspection control part 34 judges whether to restart the operation of the wind turbine, based on a result of the automatic inspection in S111. Additionally, in S108, if it is determined that the level of the lightning strike is Q2, a person may be sent within a period longer than the predetermined period (for example, within 6 months) to perform detailed inspection or repair of the wind turbine blade 21.

Figure 10:
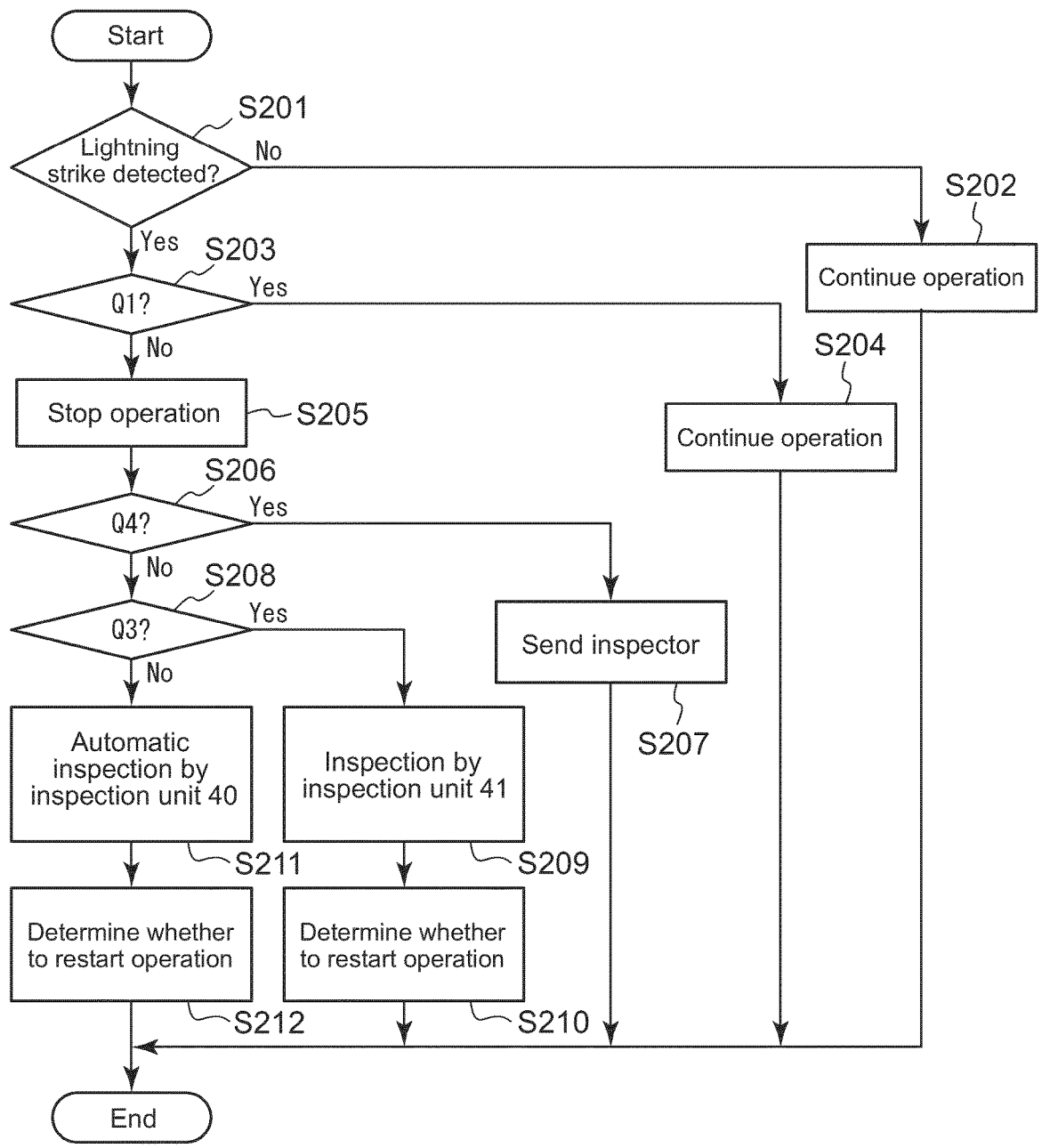
FIG. 10 is a flowchart showing another example of a method for monitoring the wind turbine 10 by the wind turbine monitoring device 100.

Next, another example of a method for monitoring the wind turbine 10 by the wind turbine monitoring device 100 will be described. FIG. 10 is a flowchart showing another example of a method for monitoring the wind turbine 10 by the wind turbine monitoring device 100.

First, in S201, the lightning level determination part 33 determines whether the current sensor 30 detects a lightning strikes on the wind turbine blade 21, based on the output of the current sensor 30.

In S201, if the current sensor 30 does not detect a lightning strike, i.e., if the current sensor 30 does not detect a current (in the case where the current sensor 30 is disposed for each wind turbine blade 21 as described above, if none of the current sensors 30 detects a current), in S202, the operation of the wind turbine 10 is continued.

In S201, if the current sensor 30 detects a lightning strike, i.e., if the current sensor detects a current (in the case where the current sensor 30 is disposed for each wind turbine blade 21 as described above, if any of the current sensors 30 detects a current), in S203, the lightning parameter acquisition part 32 acquires a peak value of lightning current flowing through the wind turbine blade 21 due to the lightning strike, a specific energy of the lightning strike obtained by integrating the square of the lightning current over the duration of the lightning strike, and an electric charge of the lightning strike obtained by integrating the lightning current over the duration of the lightning strike as lightning parameters, based on the output of the current sensor 30. Then, the lightning level determination part 33 determines whether the level of the lightning strike detected by the current sensor 30 is Q1, based on the three lightning parameters acquired by the lightning parameter acquisition part 32. The lightning level determination part 33 determines that, if all of the above-described conditions 1, 2, and 3 are satisfied, the level of the lightning strike is Q1.

In S203, if it is determined that the level of the lightning strike is Q1, in S204, the inspection control part 34 judges that inspection of the wind turbine blade 21 by the inspection unit 40 and inspection of the wind turbine blade 21 by the inspection unit 41 are both unnecessary, and continues the operation of the wind turbine 10 without inspecting the wind turbine blade 21.

In S203, if it is determined that the level of the lightning strike is not Q1 (if the level of lightning strike is more severe than Q1), in S205, the inspection control part 34 stops the operation of the wind turbine 10.

The subsequent steps S206 to S212 are the same as S106 to S112 described with reference to FIG. 9, so description thereof will be omitted.

The present disclosure is not limited to the embodiments described above, but includes modifications to the embodiments described above, and embodiments composed of combinations of those embodiments.

For instance, if the level of the lightning strike is Q4, the inspection control part 34 may perform not only visual inspection of the wind turbine blade 21 by a person but also automatic inspection of the wind turbine blade 21 by the inspection unit 40, or remote inspection of the wind turbine blade by the inspection unit 41.

Further, if the level of the lightning strike is Q3, the inspection control part 34 may perform not only remote inspection of the wind turbine blade by the inspection unit 41 but also automatic inspection of the wind turbine blade 21 by the inspection unit 40.

In the above-described embodiment, the lightning parameter acquisition part 32 acquires a peak value of lightning current flowing through the wind turbine blade 21 due to the lightning strike, a specific energy of the lightning strike obtained by integrating the square of the lightning current over the duration of the lightning strike, and an electric charge of the lightning strike obtained by integrating the lightning current over the duration of the lightning strike as lightning parameters, based on the output of the current sensor 30. However, the lightning parameter acquired by the lightning parameter acquisition part 32 is not limited to the three parameters, but may include a current, an energy, an electric charge due to the lightning strike on the wind turbine blade 21, or at least one parameter derived from at least one of the current, the energy or the electric charge.

Although in the above-described embodiment, the wind turbine monitoring device 100 arranged inside the nacelle 16 has been described, the wind turbine monitoring device 100 may be disposed in a remote place apart from the wind turbine 10 and may be configured to monitor the wind turbine 10 through communication with the wind turbine 10. In this case, similarly, the wind turbine 10 and the wind turbine monitoring device 100 constitutes a wind turbine system.

The contents described in the above embodiments would be understood as follows, for instance.

(1) A wind turbine monitoring device (e.g., wind turbine monitoring device 100 described above) according to the present disclosure is a wind turbine monitoring device for monitoring a wind turbine (e.g., wind turbine 10 described above) including a lightning sensor (e.g., current sensor 30 described above) for detecting a lightning strike on a wind turbine blade (e.g., wind turbine blade 21 described above), comprising: a lightning parameter acquisition part (e.g., lightning parameter acquisition part 32 described above) configured to acquire at least one lightning parameter based on an output of the lightning sensor; a lightning level determination part (e.g., lightning level determination part 33 described above) configured to determine a level of the lightning strike based on the at least one lightning parameter acquired by the lightning parameter acquisition part; and an inspection control part (e.g., inspection control part 34 described above) configured to judge whether it is necessary to automatically inspect the wind turbine blade by at least one inspection unit (e.g., inspection unit 40 described above) for inspecting the wind turbine blade, according the level of the lightning strike determined by the lightning level determination part.

With the wind turbine monitoring device described in the above (1), since the lightning level determination part determines the level of the lightning strike using the lightning parameter based on the output of the lightning sensor, it is possible to determine the level of the lightning strike corresponding to the magnitude of the damage risk of the wind turbine blade.

Further, since the inspection control part judges whether it is necessary to automatically inspect the wind turbine blade by the at least one inspection unit for inspecting the wind turbine blade according the level of the lightning strike determined by the lightning level determination part, it is possible to appropriately judge whether it is necessary to automatically inspect the wind turbine blade according to the magnitude of the damage risk of the wind turbine blade.

(2) In some embodiments, in the wind turbine monitoring device described in the above (1), the at least one lightning parameter includes a current, an energy, an electric charge due to the lightning strike on the wind turbine blade, or at least one parameter derived from at least one of the current, the energy or the electric charge.

With the wind turbine monitoring device described in the above (2), it is possible to appropriately judge whether it is necessary to automatically inspect the wind turbine blade, according to the level of the lightning strike determined based on a current, an energy, an electric charge due to the lightning strike, or at least one parameter derived from at least one of the current, the energy or the electric charge.

(3) In some embodiments, in the wind turbine monitoring device described in the above (1) or (2), the inspection control part is configured to: if the level of the lightning strike is a first level (e.g., Q1 described above), judge that it is unnecessary to automatically inspect the wind turbine blade by the at least one inspection unit; and if the level of the lightning strike is a second level (e.g., Q2 described above) more severe than the first level, perform automatic inspection of the wind turbine blade by the at least one inspection unit.

With the wind turbine monitoring device described in the above (3), if the level of the lightning strike on the wind turbine blade is the first level of low severity, the automatic inspection of the wind turbine blade by the inspection unit is not performed, while if the level of the lightning strike is the second level more severe than the first level, the automatic inspection of the wind turbine blade by the inspection unit is performed. Thus, it is possible to appropriately perform the automatic inspection by the inspection unit according to the level of the lightning strike without excessively performing the inspection.

(4) In some embodiments, in the wind turbine monitoring device described in the above (3), the inspection control part is configured to, when the lightning sensor detects a lightning strike on the wind turbine blade, stop the operation of the wind turbine regardless of the level of the lightning strike.

With the wind turbine monitoring device described in the above (4), it is possible to avoid a risk associated with continuing the operation of the wind turbine struck by lightning. The wind turbine monitoring device described in the above (4) can be applied to a wind turbine monitoring device that monitors a wind turbine installed in a country, a region, or the like where it is obliged to stop the operation of the wind turbine regardless of the level of lightning when the wind turbine is struck by lightning.

(5) In some embodiments, in the wind turbine monitoring device described in the above (4), the inspection control part is configured to, if the level of the lightning strike is the first level, restart the operation of the wind turbine without automatically inspecting the wind turbine blade by the at least one inspection unit.

With the wind turbine monitoring device described in the above (5), if the level of lightning strike is the first level, which has a negligible impact on the wind turbine, the wind turbine is promptly restarted without automatically inspecting the wind turbine blade. Thus, it is possible to suppress an increase in risk associated with the operation of the wind turbine struck by lightning while suppressing a decrease in the operating rate of the wind turbine.

(6) In some embodiments, in the wind turbine monitoring device described in the above (3), the inspection control part is configured to, when the lightning sensor detects a lightning strike on the wind turbine blade, continue the operation of the wind turbine without stopping if the level of the lightning strike is the first level, and stop the operation of the wind turbine if the lightning strike is more severe than the first level.

With the wind turbine monitoring device described in the above (6), if the level of lightning strike is the first level, which has a negligible impact on the wind turbine, the operation of the wind turbine is not stopped but continued, while if the level of the lightning strike is more severe than the first level, the operation of the wind turbine is stopped. Thus, it is possible to suppress an increase in risk associated with the operation of the wind turbine struck by lightning while suppressing a decrease in the operating rate of the wind turbine. The wind turbine monitoring device described in the above (6) can be applied to a wind turbine monitoring device that monitors a wind turbine installed in a country, a region, or the like where it is not obliged to stop the operation of the wind turbine regardless of the level of lightning when the wind turbine is struck by lightning.

(7) In some embodiments, in the wind turbine monitoring device described in the any one of above (3) to (6), the inspection control part is configured to, if the level of the lightning strike is the second level, perform automatic inspection of the wind turbine blade by the at least one inspection unit after stopping the operation of the wind turbine, and judge whether to restart the operation of the wind turbine based on a result of the automatic inspection of the wind turbine blade by the at least one inspection unit.

With the wind turbine monitoring device described in (7), if the level of the lightning strike is the second level more severe than the first level, it is judged whether to restart the operation of the wind turbine based on a result of the automatic inspection of the wind turbine blade by the inspection unit. Thus, it is possible to appropriately judge whether to restart the operation of the wind turbine in consideration of the damage state of the wind turbine blade due to the lightning strike.

(8) In some embodiments, in the wind turbine monitoring device described in the any one of above (3) to (7), the inspection control part is configured to, if the level of the lightning strike is a third level (e.g., Q3 described above) more severe than the second level, instruct inspection of the wind turbine blade by a different type of inspection unit (e.g., inspection unit 41 described above) from the at least one inspection unit.

With the wind turbine monitoring device described in the above (8), if the wind turbine blade is struck by lightning of the third level more severe than the second level, inspection of the wind turbine blade by an inspection unit that can perform more detailed inspection than the at least one inspection unit is prompted. Thus, it is possible to inspect the wind turbine blade with a suitable inspection unit according to the level of the lightning strike.

(9) In some embodiments, in the wind turbine monitoring device described in the above (8), the at least one inspection unit includes at least one of an imaging device (e.g., imaging device 40a described above), a microphone (e.g., microphone 40b described above), or an evaluation part (e.g., evaluation part 40c described above) configured to evaluate a damage amount of the wind turbine blade based on the at least one lightning parameter. The different type of inspection unit from the at least one inspection unit includes at least one of a load sensor (e.g., load sensor 41a described above), a drone (e.g., drone 41b described above), an evaluation part (e.g., evaluation part 41c described above) configured to evaluate a damage state of the wind turbine blade based on an output of the wind turbine, an electrical resistance sensor (e.g., electrical resistance sensor 41d described above), an acceleration sensor (e.g., acceleration sensor 41e described above), an optical sensor (e.g., optical sensor 41f described above), a deflection sensor (e.g., deflection sensor 41g described above), or a pressure sensor (e.g., pressure sensor 41h described above).

With the wind turbine monitoring device described in the above (9), if the level of the lightning strike is the first level, simple inspection can be rapidly performed, while if the level of the lightning strike is the second level more severe than the first level, more detailed inspection can be performed.

(10) In some embodiments, in the wind turbine monitoring device described in the above (8) or (9), the inspection control part is configured to, if the level of the lightning strike is a fourth level (e.g., Q4 described above) more severe than the third level, transmit information indicating that it is necessary to manually inspect the wind turbine blade without restarting the operation of the wind turbine.

With the wind turbine monitoring device described in (10), if the level of the lightning strike is the fourth level more severe than the third level, detailed inspection of the wind turbine blade by a person is prompted without restarting the operation of the wind turbine in consideration of high damage risk of the wind turbine blade. After the wind turbine blade is inspected in detail and repaired as necessary, the operation of the wind turbine blade may be restarted.

(11) A wind turbine system according to the present disclosure comprises the wind turbine monitoring device described in any one of the above (1) to (10) and the wind turbine.

With the wind turbine system described in the above (11), it is possible to appropriately judge whether it is necessary to automatically inspect the wind turbine blade, according to the level of the lightning strike on the wind turbine blade.

(12) In some embodiments, in the wind turbine system described in the above (11), the lightning sensor is a current sensor (e.g., current sensor 30 described above) for detecting a current flowing through the wind turbine blade.

With the wind turbine system described in the above (12), by determining the level of the lightning strike using the lightning parameter based on the current flowing through the wind turbine blade, it is possible to appropriately judge whether it is necessary to automatically inspect the wind turbine blade by the at least one inspection unit.

(13) A wind turbine monitoring method according to the present disclosure is a method for monitoring a wind turbine (e.g., wind turbine 10 described above) including a lightning sensor (e.g., current sensor 30 described above) for detecting a lightning strike on a wind turbine blade (e.g., wind turbine blade 21 described above), comprising: acquiring at least one lightning parameter based on an output of the lightning sensor; and judging whether it is necessary to automatically inspect the wind turbine blade by at least one inspection unit (e.g., inspection unit 40 described above) for inspecting the wind turbine blade, according the level of the lightning strike determined based on the at least one lightning parameter.

With the wind turbine monitoring method described in the above (13), since the level of the lightning strike is determined using the lightning parameter based on the output of the lightning sensor, and it is judged whether it is necessary to automatically inspect the wind turbine blade by the at least one inspection unit according to the level of the lightning strike, it is possible to appropriately judge the necessity of the automatic inspection of the wind turbine blade according to the level of the lightning strike on the wind turbine blade.

The invention claimed is:

1. A wind turbine monitoring device for monitoring a wind turbine including a lightning sensor for detecting a lightning strike on a wind turbine blade, comprising:
    a lightning parameter acquisition part configured to acquire at least one lightning parameter based on an output of the lightning sensor;
    a lightning level determination part configured to determine a level of the lightning strike based on the at least one lightning parameter acquired by the lightning parameter acquisition part; and
    an inspection control part configured to determine whether it is necessary to automatically inspect, without any manual operation, the wind turbine blade by at least one inspection unit for inspecting the wind turbine blade, according to the level of the lightning strike determined by the lightning level determination part,
    wherein the inspection control part is configured to:
        when the level of the lightning strike is a first level, determine that it is unnecessary to automatically inspect the wind turbine blade by the at least one inspection unit;
        when the level of the lightning strike is a second level more severe than the first level, perform automatic inspection of the wind turbine blade by the at least one inspection unit; and
        when the level of the lightning strike is a third level more severe than the second level, instruct inspection of the wind turbine blade by a different type of inspection unit from the at least one inspection unit.

2. The wind turbine monitoring device according to claim 1, wherein the at least one lightning parameter includes a current, an energy, an electric charge due to the lightning strike on the wind turbine blade, or at least one parameter derived from at least one of the current, the energy or the electric charge.

3. The wind turbine monitoring device according to claim 1, wherein the inspection control part is configured to, when the lightning sensor detects the lightning strike on the wind turbine blade, stop operation of the wind turbine regardless of the level of the lightning strike.

4. The wind turbine monitoring device according to claim 3, wherein the inspection control part is configured to, when the level of the lightning strike is the first level, restart operation of the wind turbine without automatically inspecting the wind turbine blade by the at least one inspection unit.

5. The wind turbine monitoring device according to claim 1, wherein the inspection control part is configured to, when the lightning sensor detects the lightning strike on the wind turbine blade, continue operation of the wind turbine without stopping when the level of the lightning strike is the first level, and stop operation of the wind turbine when the lightning strike is more severe than the first level.

6. The wind turbine monitoring device according to claim 1, wherein the inspection control part is configured to, when the level of the lightning strike is the second level, perform automatic inspection of the wind turbine blade by the at least one inspection unit after stopping operation of the wind turbine, and determine whether to restart operation of the wind turbine based on a result of the automatic inspection of the wind turbine blade by the at least one inspection unit.

7. The wind turbine monitoring device according to claim 1, wherein the at least one inspection unit includes at least one of an imaging device, a microphone, or an evaluation part configured to evaluate a damage amount of the wind turbine blade based on the at least one lightning parameter, and wherein the different type of inspection unit from the at least one inspection unit includes at least one of a load sensor, a drone, or an evaluation part configured to evaluate a damage state of the wind turbine blade based on an output of the wind turbine, an electrical resistance sensor, an acceleration sensor, an optical sensor, a deflection sensor, or a pressure sensor.

8. The wind turbine monitoring device according to claim 1, wherein the inspection control part is configured to, when the level of the lightning strike is a fourth level more severe than the third level, transmit information indicating to manually inspect the wind turbine blade without restarting operation of the wind turbine.

9. A wind turbine system, comprising:
a wind turbine comprising a wind turbine blade; and
a wind turbine monitoring device for monitoring a wind turbine including a lightning sensor for detecting a lightning strike on the wind turbine blade, the wind turbine monitoring device, comprising:
  a lightning parameter acquisition part configured to acquire at least one lightning parameter based on an output of the lightning sensor;
  a lightning level determination part configured to determine a level of the lightning strike based on the at least one lightning parameter acquired by the lightning parameter acquisition part; and
  an inspection control part configured to determine whether it is necessary to automatically inspect, without any manual operation, the wind turbine blade by at least one inspection unit for inspecting the wind turbine blade, according to the level of the lightning strike determined by the lightning level determination part, and
  wherein the inspection control part is configured to:
    when the level of the lightning strike is a first level, determine that it is unnecessary to automatically inspect the wind turbine blade by the at least one inspection unit;
    when the level of the lightning strike is a second level more severe than the first level, perform automatic inspection of the wind turbine blade by the at least one inspection unit; and
    when the level of the lightning strike is a third level more severe than the second level, instruct inspection of the wind turbine blade by a different type of inspection unit from the at least one inspection unit.

10. The wind turbine system according to claim 9, wherein the lightning sensor is a current sensor for detecting a current flowing through the wind turbine blade.

11. The wind turbine system according to claim 9, wherein the at least one lightning parameter includes a current, an energy, an electric charge due to the lightning strike on the wind turbine blade, or at least one parameter derived from at least one of the current, the energy or the electric charge.

12. The wind turbine system according to claim 9, wherein the inspection control part is configured to, when the lightning sensor detects the lightning strike on the wind turbine blade, stop operation of the wind turbine regardless of the level of the lightning strike.

13. The wind turbine system according to claim 12, wherein the inspection control part is configured to, when the level of the lightning strike is the first level, restart operation of the wind turbine without automatically inspecting the wind turbine blade by the at least one inspection unit.

14. The wind turbine system according to claim 9, wherein the inspection control part is configured to, when the lightning sensor detects the lightning strike on the wind turbine blade, continue operation of the wind turbine without stopping when the level of the lightning strike is the first level, and stop operation of the wind turbine when the lightning strike is more severe than the first level.

15. The wind turbine system according to claim 9, wherein the inspection control part is configured to, when the level of the lightning strike is the second level, perform automatic inspection of the wind turbine blade by the at least one inspection unit after stopping operation of the wind turbine, and determine whether to restart operation of the wind turbine based on a result of the automatic inspection of the wind turbine blade by the at least one inspection unit.

16. The wind turbine system according to claim 9, wherein the at least one inspection unit includes at least one of an imaging device, a microphone, or an evaluation part configured to evaluate a damage amount of the wind turbine blade based on the at least one lightning parameter, and wherein the different type of inspection unit from the at least one inspection unit includes at least one of a load sensor, a drone, or an evaluation part configured to evaluate a damage state of the wind turbine blade based on an output of the wind turbine, an electrical resistance sensor, an acceleration sensor, an optical sensor, a deflection sensor, or a pressure sensor.

17. A wind turbine monitoring method for monitoring a wind turbine including a lightning sensor for detecting a lightning strike on a wind turbine blade, comprising:
  acquiring at least one lightning parameter based on an output of the lightning sensor;
  determining a level of the lightning strike based on the at least one lightning parameter; and
  determining whether it is necessary to automatically inspect, without any manual operation, the wind turbine blade by at least one inspection unit for inspecting the wind turbine blade, according to the level of the lightning strike, and
  wherein determining whether it is necessary to automatically inspect the wind turbine blade comprises:
    when the level of the lightning strike is a first level, determining that it is unnecessary to automatically inspect the wind turbine blade by the at least one inspection unit;
    when the level of the lightning strike is a second level more severe than the first level, performing automatic inspection of the wind turbine blade by the at least one inspection unit; and
    when the level of the lightning strike is a third level more severe than the second level, instruct inspection of the wind turbine blade by a different type of inspection unit from the at least one inspection unit.

18. The method according to claim 17, wherein the at least one lightning parameter includes a current, an energy, an electric charge due to the lightning strike on the wind turbine blade, or at least one parameter derived from at least one of the current, the energy or the electric charge.

19. The method according to claim 17, wherein determining whether it is necessary to automatically inspect the wind turbine blade comprises: when the lightning sensor detects the lightning strike on the wind turbine blade, stopping operation of the wind turbine regardless of the level of the lightning strike.

20. The method according to claim 19, wherein determining whether it is necessary to automatically inspect the wind turbine blade comprises: when the level of the lightning strike is the first level, restarting operation of the wind turbine without automatically inspecting the wind turbine blade by the at least one inspection unit.

\* \* \* \* \*